United States Patent
Schillert et al.

(10) Patent No.: US 7,336,193 B2
(45) Date of Patent: Feb. 26, 2008

(54) DEVICE FOR MONITORING THE LEAKAGE CURRENT OF A SURGE ARRESTER

(75) Inventors: Haiko Schillert, Mahlow (DE); Matthias Schubert, Berlin (DE); Kai Steinfeld, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 118 days.

(21) Appl. No.: 10/573,545

(22) PCT Filed: Sep. 16, 2004

(86) PCT No.: PCT/DE2004/002123

§ 371 (c)(1),
(2), (4) Date: Mar. 27, 2006

(87) PCT Pub. No.: WO2005/031931

PCT Pub. Date: Apr. 7, 2005

(65) Prior Publication Data

US 2006/0203412 A1    Sep. 14, 2006

(30) Foreign Application Priority Data

Sep. 25, 2003    (DE) ................. 103 45 658

(51) Int. Cl.
*G08B 21/00*    (2006.01)
(52) U.S. Cl. .................. 340/664; 340/538.16; 340/646; 307/105; 324/72; 324/549; 361/93.1; 361/93.6; 361/118
(58) Field of Classification Search ................ 340/664, 340/646, 657, 310.17, 538.16; 307/105; 342/72, 530, 549; 361/93.1, 93.6, 117, 118
See application file for complete search history.

(56) References Cited

U.S. PATENT DOCUMENTS 6,879,479 B2 *  4/2005  Colombo et al. .......... 361/93.6
7,005,863 B2 *  2/2006  Gudmundsson et al. .... 324/549

FOREIGN PATENT DOCUMENTS

| DE | 296 15 186 U1 | 12/1996 |
|----|----|----|
| JP | 3-1476 | 1/1991 |
| JP | 8-17552 | 1/1996 |
| JP | 9-145759 | 6/1997 |
| JP | 11-307226 | 11/1999 |
| JP | 2000-321318 | 11/2000 |
| JP | 2003-37932 | 2/2003 |

* cited by examiner

*Primary Examiner*—Davetta W. Goins
(74) *Attorney, Agent, or Firm*—Laurence A. Greenberg; Werner H. Stemer; Ralph E. Locher

(57) ABSTRACT

A device for monitoring a leakage current of a surge arrester has a measuring element for detecting a leakage current in a leakage current circuit. A filter assembly filters the leakage current in order to extract a third harmonic oscillation which is evaluated by an evaluation circuit with respect to the value thereof. The evaluation circuit delivers at least one warning signal to a display device. In a preferred embodiment, three display devices operating as a signaling light are provided. A power supply for the used circuits is obtainable by way of a transformer which extracts a necessary auxiliary zero-potential energy contained in the leakage current and with the aid of a main power supply unit connected to the transformer.

12 Claims, 2 Drawing Sheets

DEVICE FOR MONITORING THE LEAKAGE CURRENT OF A SURGE ARRESTER

BACKGROUND OF THE INVENTION

Field of the Invention

The invention relates to a device for monitoring the leakage current of a surge arrester in accordance with the precharacterizing clause of the main claim.

Surge arresters for electrical power transmission systems are extremely reliable devices. However, it is often nevertheless desirable to monitor the operating state of the arrester. This is particularly the case when the devices are subject to unusually stringent requirements, for example owing to the design or environmental conditions, or are installed at particularly significant points in the system, such as at machine transformers or strategically important substations. In this case, the user would wish to be able to use monitoring devices to identify in good time whether the arrester is capable of reliably arresting surges having the specified power content at any time or whether the arrester has been damaged or is at risk of failure. In addition to the established method of introducing a monitoring spark gap in series with the arrester, in the case of which witness marks on the polished electrodes of the spark gap are evaluated, and in addition to the method of using surge counters which register the occurrence of an arresting process above a specific amplitude, methods involving the measurement of leakage currents are known in particular in the case of modern metal-oxide arresters. In the case of metal-oxide arresters, the active part is not DC-isolated from the power supply system but is connected permanently to the voltage. The electrical properties of the active part are thus reflected at any point in time in the leakage current through the arrester. So-called total leakage current measurement is known, in the case of which the peak value for the total leakage current is usually evaluated, use being made of the fact that an increasing resistive component is superimposed on the normally predominantly capacitive leakage current as the temperature of the active part increases or as the voltage applied to said active part increases, and this increasing resistive component increases the total leakage current. Various influencing variables which are included in the total leakage current may, however, result in erroneous interpretations, and only a low degree of information quality can be achieved with this method.

The Patent Abstract of Japan JP 11307226 A has disclosed a monitoring device for a surge arrester. The monitoring device is supplied from an external power supply device. The voltage produced by this external power supply device is synchronized with the system voltage of the surge arrester in order to ensure monitoring of the surge arrester.

Furthermore, the Patent Abstract of Japan JP 2003037932 A has disclosed a surge arrester which has a device which monitors the ageing of the arrester. Leakage-current monitoring detects the leakage current of the surge arrester. In addition, the number of arresting processes of the surge arrester is monitored. When a predetermined number of arresting processes has been reached, correspondingly differently colored light signals are output.

Patent Abstracts of Japan JP 09145759 A and JP 2000321318 A have each disclosed apparatuses for monitoring a surge arrester. For monitoring purposes, the leakage current of an arrester is monitored and evaluated in a computer unit. For this purpose, a Fourier transformation is carried out, for example. The result of the analysis is represented in each case on a display device.

The Patent Abstract of Japan JP 03001476 A has disclosed a monitoring device for inspecting a surge arrester. An instrument transformer is inserted into the ground current path of a surge arrester. In this case, the ground connection forms the primary winding. The instrument transformer is fed an inspection current from an external AC voltage source.

The Patent Abstract of Japan JP 08017552 A has disclosed a device for monitoring a leakage current of a surge arrester. The leakage current of the surge arrester is monitored by means of a detection device. A resistive component is calculated from the measured leakage current by means of a computation unit. This resistive component of the leakage current is used to diagnose the state of the surge arrester.

The zinc oxide material used, for example, for metal-oxide arresters has a conductance which is nonlinear as a function of the voltage and leads to the formation of a third harmonic component in the resistive leakage current of the arrester when a sinusoidal voltage is applied. If the resistive component of the leakage current is increased, for example by means of degradation, this results in a shift to the range of altered nonlinearity of the characteristic and thus in a further rise in the third harmonic component content. Methods are therefore known in which analysis of the third harmonic of the leakage current is carried out. For this purpose, the leakage current is generally output via a measuring element and passed via a filter arrangement, by means of which the third harmonic component is filtered out and is evaluated in terms of its amplitude. However, at present this method has the disadvantage that the available devices are costly and require a high degree of experience for correctly measuring and interpreting the measured values. In addition, these devices require auxiliary power for their voltage supply and are therefore generally not used for continuous long-term monitoring on arresters.

SUMMARY OF THE INVENTION

The invention is therefore based on the object of providing a device for monitoring the leakage current of a surge arrester using the third harmonic of the leakage current, in the case of which no auxiliary power is required for the supply of the components and the measurement results can be evaluated in a simple manner, and which can be produced in a cost-effective manner, with the result that continuous long-term monitoring of the surge arrester is possible.

This object is achieved according to the invention by the characterizing features of the main claim in conjunction with the features of the precharacterizing clause.

As a result of the fact that the filter arrangement is connected to an evaluation circuit for the third harmonic, which, if appropriate, outputs at least one warning signal to a display apparatus which is connected to the evaluation circuit, and the fact that a transformer is connected in the arrester circuit, via which transformer the power for a voltage supply to the filter arrangement and the evaluation circuit can be output, no auxiliary power is required for the electronic components, i.e. the latter are fed the leakage current, and no user-dependent erroneous interpretation is possible and only low demands are placed on the qualifications of the user since the result of the monitoring is displayed. Furthermore, the device can be produced from standard electronic components, as a result of which it is cost-effective. The device can therefore be installed permanently at the arrester for continuous monitoring purposes.

The measures specified in the dependent claims make advantageous developments and improvements possible. A measuring resistor can advantageously be used as the measuring element, but the use of a current-compensated coil arrangement comprising a current compensator is also possible.

An active bandpass filter having a frequency of 150 Hz can be used as the filter arrangement, and a microprocessor can be used as the evaluation circuit. In one simplified embodiment, the microprocessor can be replaced by a single discrete or integrated threshold value switch.

In one advantageous embodiment, the display apparatus has one or more light-emitting diodes, in which case only one light-emitting diode can be provided for the simplified version with the threshold value switch, which light-emitting diode displays the instance of a predetermined threshold value being exceeded. However, three light-emitting diodes with the colors of a traffic light are particularly advantageously connected to the microprocessor and display the fault-free, the critical and the faulty operating modes. It is particularly advantageous to connect a coil arrangement having a toroidal core and two windings, which are wound around the toroidal core and whose connections are passed to the outside, into the arrester circuit, since, in the critical case, i.e. when the evaluation circuit outputs a warning signal, an external measuring device can be connected which can carry out a more accurate measurement and evaluation of the operating state.

Exemplary embodiments of the invention are illustrated in the drawing and will be explained in more detail in the description below. In the drawing:

DESCRIPTION OF THE PREFERRED EMBODIMENTS

Figure 1:
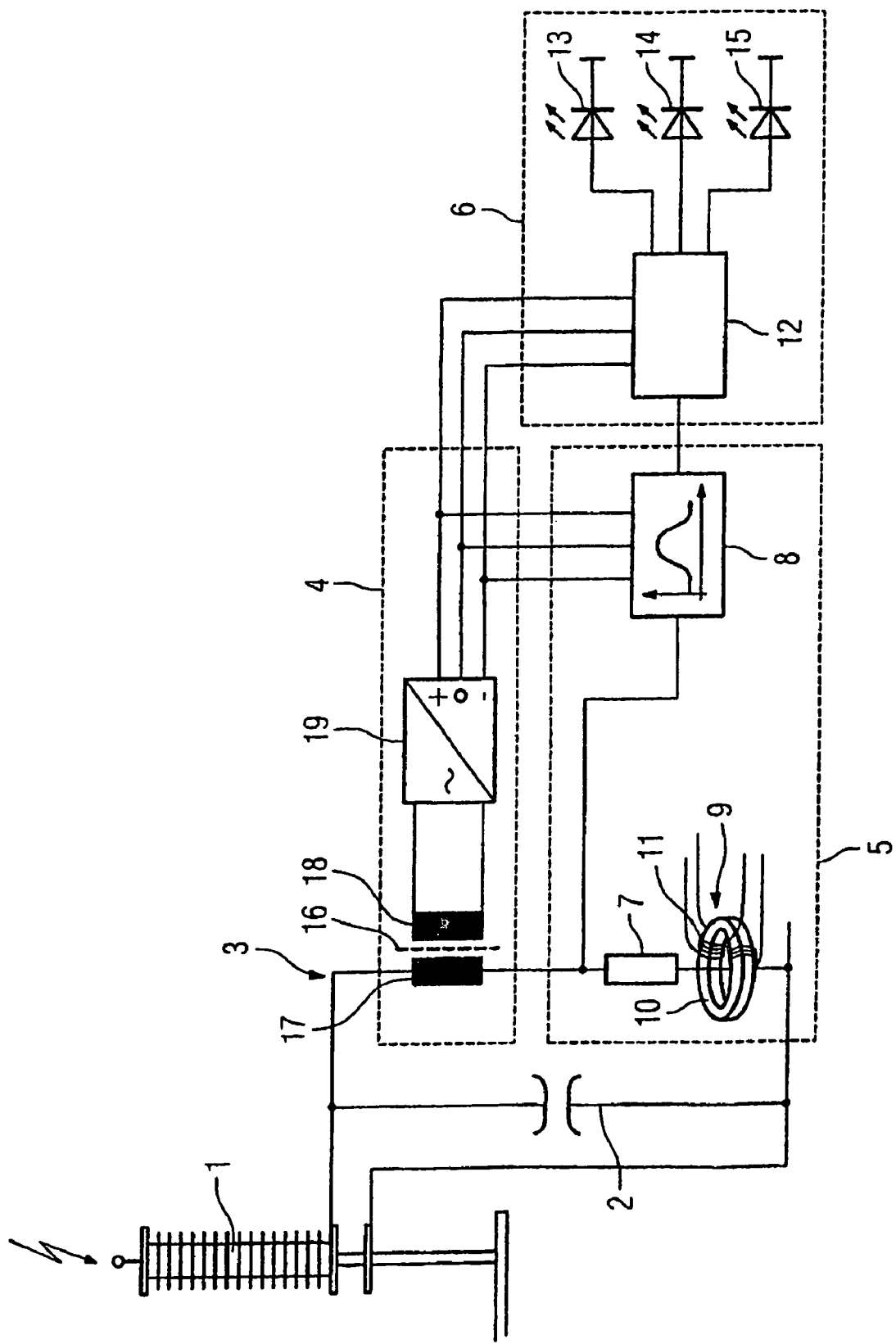
FIG. 1 shows one circuitry refinement of the monitoring device according to the invention.

The device for monitoring the leakage current illustrated in FIG. 1 has a metal-oxide arrester 1 having a protection spark gap 2 for arrester currents and the actual leakage current path 3. In addition to the arrester 1, the device comprises three switching units, a voltage supply unit 4, a checking circuit 5 for the third harmonic and an evaluation unit 6. The checking circuit 5 has a measuring resistor 7, which is connected into the leakage current path 3, and an active bandpass filter 8 having a mid-frequency of 150 Hz. In addition, a coil arrangement 9 is arranged in the leakage circuit 3, said coil arrangement 9 having a toroidal core 10 and two coils 11 wound around the toroidal core, the connections of the coils being passed to the outside for connection to an external measuring device.

The evaluation unit 6 essentially comprises a microprocessor circuit 12 and three light-emitting diodes 13, 14, 15, which, in the exemplary embodiment, are selected to be the colors of a traffic light, namely green, amber and red. Of course other light sources can in principle also be used, in which case, if appropriate, one or more audible display elements are also conceivable in place of the visual display elements.

The voltage supply unit 4 comprises a transformer 16, whose primary winding 17 is connected into the leakage current path 3, and whose secondary winding 18 is connected to a switched mode power supply 19 having a rectification circuit and a filter circuit. The bandpass filter 8 and the microprocessor circuit 12 are connected to the outputs of the switched mode power supply 19 for their voltage supply. The auxiliary power is output, floating, from the leakage current flowing in the leakage current path 3 via the transformer 16, the secondary coil 18 providing the switched mode power supply 19 with an alternating current. The switched mode power supply carries out rectification and filtering and makes a positive and a negative DC voltage having a corresponding zero potential available at its output.

During operation of the arrester 1, the leakage current is checked by the measuring resistor 7 and passed on to the active bandpass filter 8, which filters out the third harmonic from the checked leakage current. The microprocessor circuit 12 evaluates the third harmonic on the basis of the magnitude of its peak value and drives the LEDs 13 to 15. For this purpose, the microprocessor circuit 12 contains three threshold values, in which case, in the event of a peak value below a first threshold value, normal operation is indicated by a green LED 13, in the event of a peak value above the first threshold value but below the second threshold value, the critical range is indicated by an amber LED 14, and, in the event of a peak value above the second threshold value, faulty operation is indicated by a red LED.

As has already been explained above, the coil arrangement 9, which can be connected as a current-compensated coil, is used merely as an additional sensor for an external measuring device for precise, compensated measurement of the third harmonic, if, for example, the amber LED 14 blinks.

Figure 2:
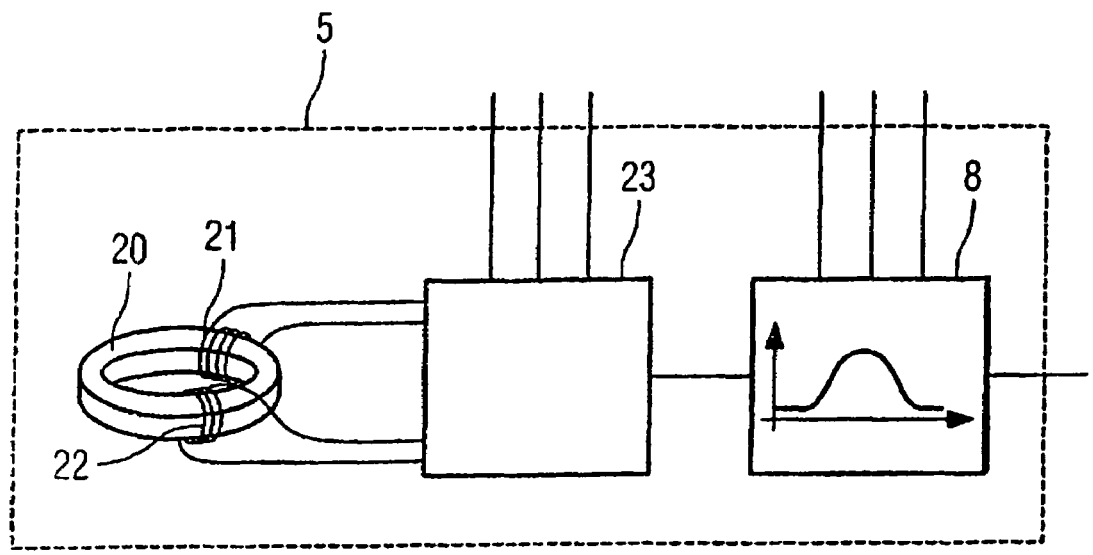
FIG. 2 shows a further embodiment of the checking circuit used in FIG. 1 for the third harmonic.

FIG. 2 illustrates a further embodiment of a checking circuit 5, which can be used in place of the checking circuit shown in FIG. 1, i.e. the measuring resistor 7 shown in FIG. 1 is replaced by a current-compensated coil arrangement, which has a toroidal core 20 having two coils 21, 22 and a current compensator 23 connected to the connections of the coils 21, 22. In this case, the total magnetic field of the coil arrangement is brought to zero by means of a reverse current, with the result that the measured voltage is available at the output of the current compensator 23. The active bandpass filter 8 in turn filters out the third harmonic.

Figure 3:
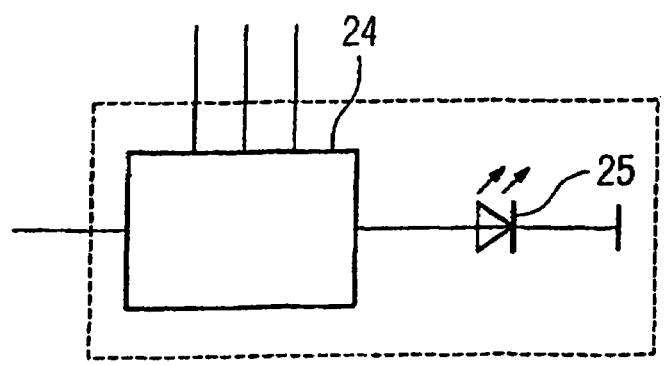
FIG. 3 shows a further embodiment of the evaluation circuit used in FIG. 1 with a display.

FIG. 3 illustrates one variant of the evaluation unit 6, in the case of which the microprocessor circuit 12 is replaced by a single threshold value switch 24, which has only one threshold value for the display of the critical operating range. In this exemplary embodiment, there is only one LED 25, which can illuminate or blink amber, for example.

The coil arrangement 9 can also be provided in all of the exemplary embodiments.

We claim:

1. A device for monitoring a leakage current of a surge arrester, comprising:

a measuring element for checking the leakage current flowing in an arrester circuit connected to the surge arrester;

a filter arrangement for filtering out a third harmonic from the leakage current, the third harmonic being a measure of an operating state of the surge arrester;

an evaluation circuit for the third harmonic connected to said filter arrangement;

a display apparatus connected to said evaluation circuit for outputting, if appropriate, at least one warning signal; and a transformer connected in the arrester circuit, said transformer having an output carrying an energy for a voltage supply to said filter arrangement and said evaluation circuit.

2. The device according to claim 1, wherein said transformer has a primary winding connected in the arrester circuit, and a secondary winding connected to a rectifier circuit, and said rectifier circuit is connected to said filter arrangement and said evaluation circuit.

3. The device according to claim 1, wherein said measuring element is a measuring resistor.

4. The device according to claim 1, wherein said measuring element is a current-compensated coil assembly with a current compensator connected to said filter arrangement and a rectifier circuit.

5. The device according to claim 1, wherein said filter arrangement comprises an active bandpass filter.

6. The device according to claim 1, wherein said evaluation circuit comprises a microprocessor circuit configured to evaluate peak values of the third harmonic and to output at least one warning signal.

7. The device according to claim 1, wherein said evaluation circuit is a threshold value circuit configured to output a warning signal when a threshold value is exceeded.

8. The device according to claim 1, wherein said display apparatus includes a visual display.

9. The device according to claim 8, wherein said display apparatus has at least one LED.

10. The device according to claim 1, wherein said display apparatus is configured to output an audible warning signal.

11. The device according to claim 1, wherein said display apparatus comprises a plurality of LEDs, and said evaluation circuit is configured to drive different LEDs based on a magnitude of respective peak values.

12. The device according to claim 1, which comprises a coil assembly with a toroidal core and two coils wound around said toroidal core connected in the arrester circuit, said coils having connecting terminals for connection to an external measuring device on occasion of a presence of a warning signal.

* * * * *